United States Patent [19]

Murphy

[11] 3,974,895

[45] Aug. 17, 1976

[54] EMERGENCY BRAKE UNIT

[76] Inventor: Patrick N. Murphy, 3505 Chester Ave., Bakersfield, Calif. 93301

[22] Filed: Mar. 10, 1975

[21] Appl. No.: 556,658

[52] U.S. Cl. .................................. 188/76; 192/73
[51] Int. Cl.² ........................................ F16D 53/00
[58] Field of Search .................... 188/76, 73.3, 72.4, 188/72.5; 192/73

[56] References Cited
UNITED STATES PATENTS

| | | | |
|---|---|---|---|
| 535,376 | 3/1895 | Hill | 192/73 |
| 3,199,635 | 8/1965 | Bessler et al. | 188/73.3 X |
| 3,357,525 | 12/1967 | Francois | 188/76 |
| 3,853,207 | 12/1974 | Rist | 188/76 |

FOREIGN PATENTS OR APPLICATIONS

| | | | |
|---|---|---|---|
| 862,067 | 11/1940 | France | 188/76 |
| 121,736 | 8/1900 | Germany | 192/73 |

*Primary Examiner*—George E. A. Halvosa
*Attorney, Agent, or Firm*—William C. Babcock

[57] ABSTRACT

An emergency brake unit that is hydraulically operated which may be removably secured in pairs to the axle of a pneumatic-tired freight vehicle. In an emergency the pair of brake units may be concurrently actuated to bring first and second braking surfaces into frictional contact with both the interior and exterior surfaces of the brake drums with which they are associated. Each of the emergency brake units is of such structure that it may be used with a brake drum of either a left or right pneumatic-tired wheel. The braking surfaces of the emergency brake units are preferably metallic, and are brought into metal-to-metal contact with the exterior and interior surfaces of the brake drum when the units are actuated by hydraulic fluid under pressure.

4 Claims, 6 Drawing Figures

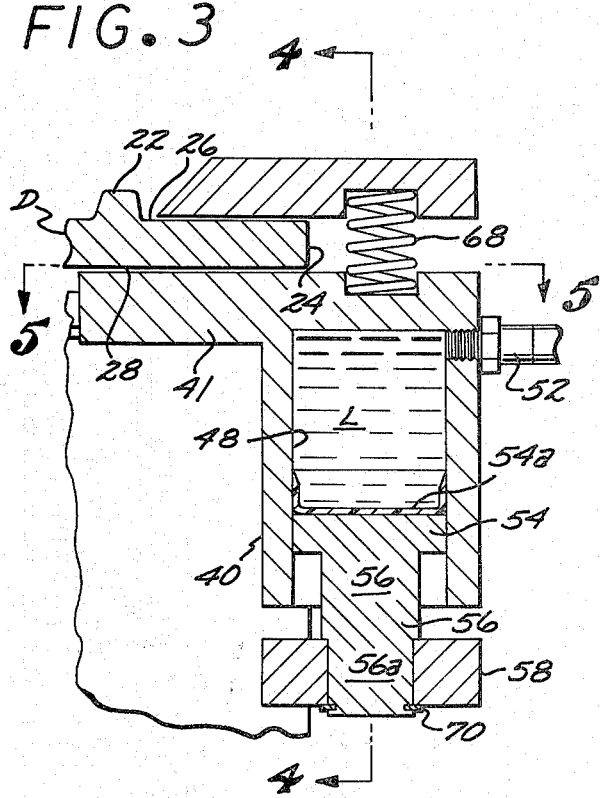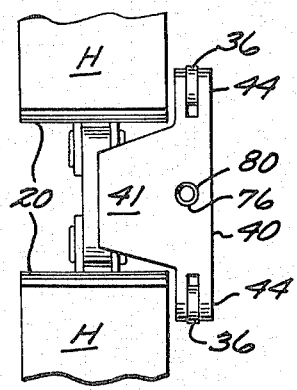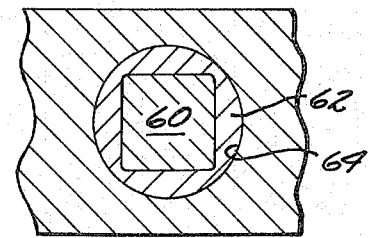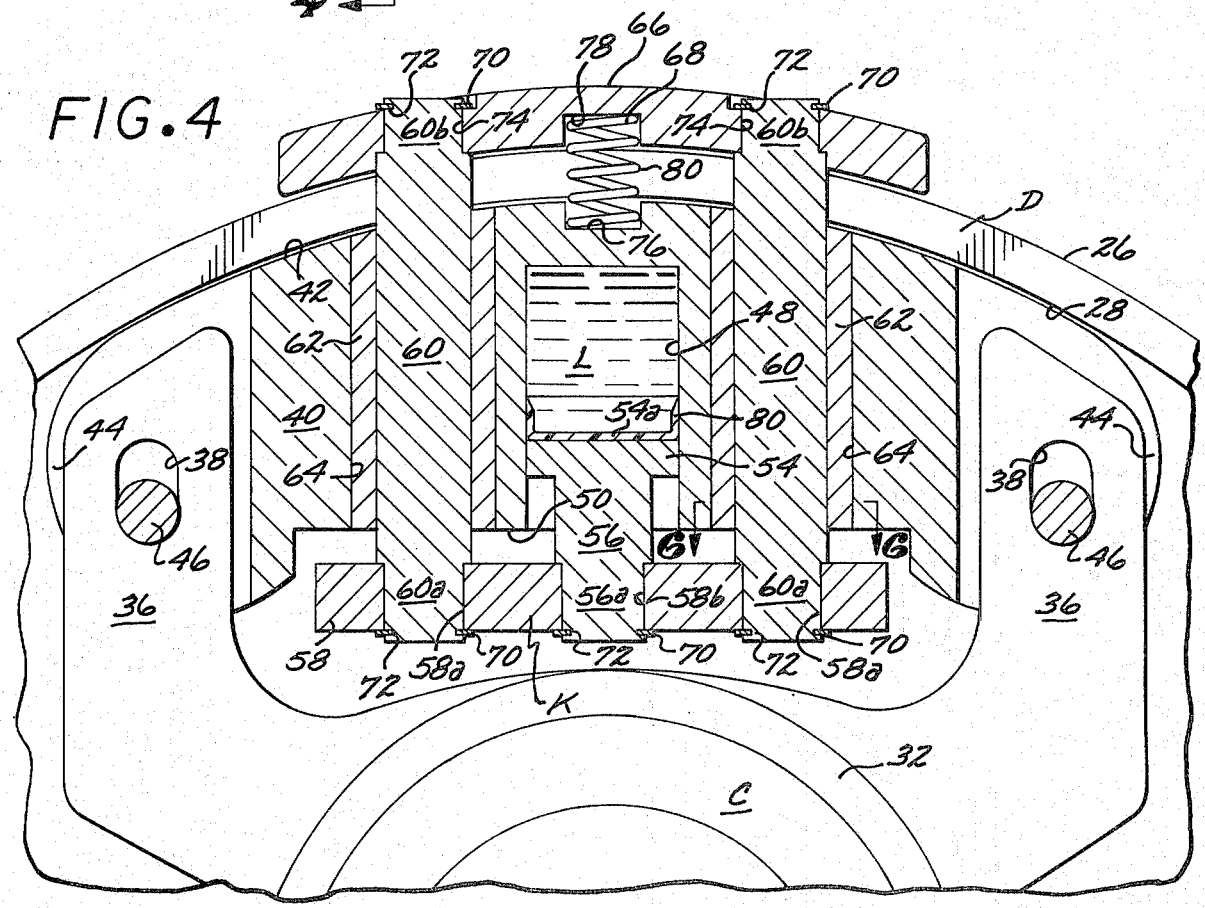

EMERGENCY BRAKE UNIT

BACKGROUND OF THE INVENTION

1. Field of the Invention

Emergency brake unit.

2. Description of the Prior Art

In the past, various types of emergency brake units have been devised and used, such as that disclosed and claimed in applicant's prior U.S. Pat. No. 3,098,545 entitled "Emergency Brake" which issued July 23, 1963. Such devices have the operational disadvantage that they are unduly complicated in structure, expensive, and are not susceptible of easy installation.

The primary object in devising the present invention is to supply an emergency brake unit that is used in pairs on the axle of a pneumatic-tired freight vehicle, with the pair of units when actuated, bringing first and second braking surfaces into pressure frictional contact with portions of the brake drum situated between the spaced ends of internal brake shoes that are utilized in the normal braking of the vehicle.

Another object of the invention is to furnish emergency brake units that may be employed to bring a pneumatic-tired freight vehicle to a stop in the event of failure of the air-operated brakes normally utilized in the braking of the vehicle.

Another object of the invention is to provide emergency brake units that are removably mounted on the axle of a pneumatic-tired freight vehicle, and due to the structural simplicity of the emergency brake units, they require a minimum of maintenance attention.

SUMMARY OF THE INVENTION

An emergency brake unit that may be removably mounted on the axle of a pneumatic-tired freight vehicle and operatively associated with the brake drum of either a left or right-hand wheel. The brake units are removably mounted in pairs on an axle adjacent the brake drums of the wheels rotatably supported on the axle.

Each emergency brake unit includes first and second clamps, which by bolts or other fastening means, are secured to an axle. The second clamp has two laterally spaced arms projecting therefrom, in which arms elongate longitudinal slots are formed. A rigid metallic body is provided that has bifurcated ends which slidably engage the arms, with the body being held on the arms by transverse pins that extend through the bifurcated ends and slidably engage the slots.

The body defines a curved braking surface that is substantially the same radius of curvature as the interior surface of the brake drum with which it is associated. A yoke is slidably supported by the body, with the yoke supporting a curved metallic brake shoe that may frictionally engage the exterior surface of the drum.

A compressed helical spring tends to at all times maintain the body and brake shoe in a first spaced relationship where they do not contact the brake drum with which they are associated.

A piston is slidably mounted in a hydraulic cylinder defined in the body, to which cylinder hydraulic fluid may be supplied under pressure by the person controlling the freight vehicle. A rod extends from the piston to the yoke. Braking of the freight vehicle will normally be effected by an air brake assembly in which brake shoes within the brake drum are pivoted to a braking position. The first ends of the internal brake shoes are spaced a substantial distance from one another.

The braking surfaces of the present invention when the latter is actuated, are brought into pressure braking contact with the internal and external surfaces of the brake drum situated between the first ends of the internal brake shoe. When an emergency arises, the person in control of the freight vehicle causes hydraulic fluid to be discharged into the hydraulic cylinder, with the pistons, piston rod, yoke and brake shoe being moved towards the axle.

The brake shoe is moved into pressure frictional contact with the external surface of the brake drum as fluid is so discharged into the cylinder. As additional hydraulic fluid is discharged into the cylinder, the yoke remains stationaery, and the body is forced away from the axle to bring the braking surface of the body into pressure frictional contact with the interior surface of the brake drum.

Upon release of the pressure on the hydraulic fluid in the cylinder, the compressed helical spring will expand and cause the brake shoe and body to move to the first spaced relationship where they are out of contact with the brake drum. Movement of the body as above described is possible due to the transverse pins being slidable in the longitudinal slots in the arms extending from the second clamp.

The emergency brake units are mounted as laterally spaced pairs on the axle, and when actuated, brake both the left and right-hand drums of the freight vehicle with which they are associated.

BRIEF DESCRIPTION OF THE DRAWING

FIG. 3 is a transverse cross-sectional view of the brake unit taken on the line 3—3 of FIG. 1;

FIG. 4 is a combined elevational and longitudinal cross-sectional view of the brake unit taken on the line 4—4 of FIG. 3;

FIG. 5 is a top plan view of the emergency brake unit and illustrating the position thereof relative to first ends of the internal brake shoes in the drum; and FIG. 6 is a fragmentary transverse cross-sectional view of a portion of the emergency brake unit taken on the line 6—6 of FIG. 4.

DESCRIPTION OF THE PREFERRED EMBODIMENT

Figure 1:
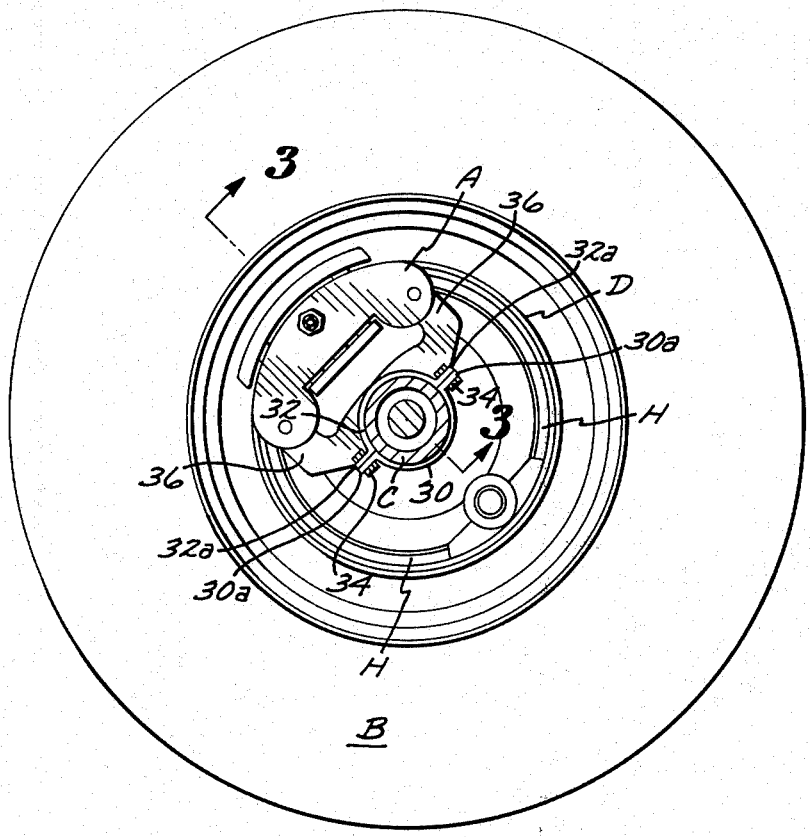
FIG. 1 is a side elevational view of a pneumatic-tired wheel rotatably supported from an axle, and illustrating the emergency brake unit operatively associated with the brake drum of the wheel.
Figure 2:
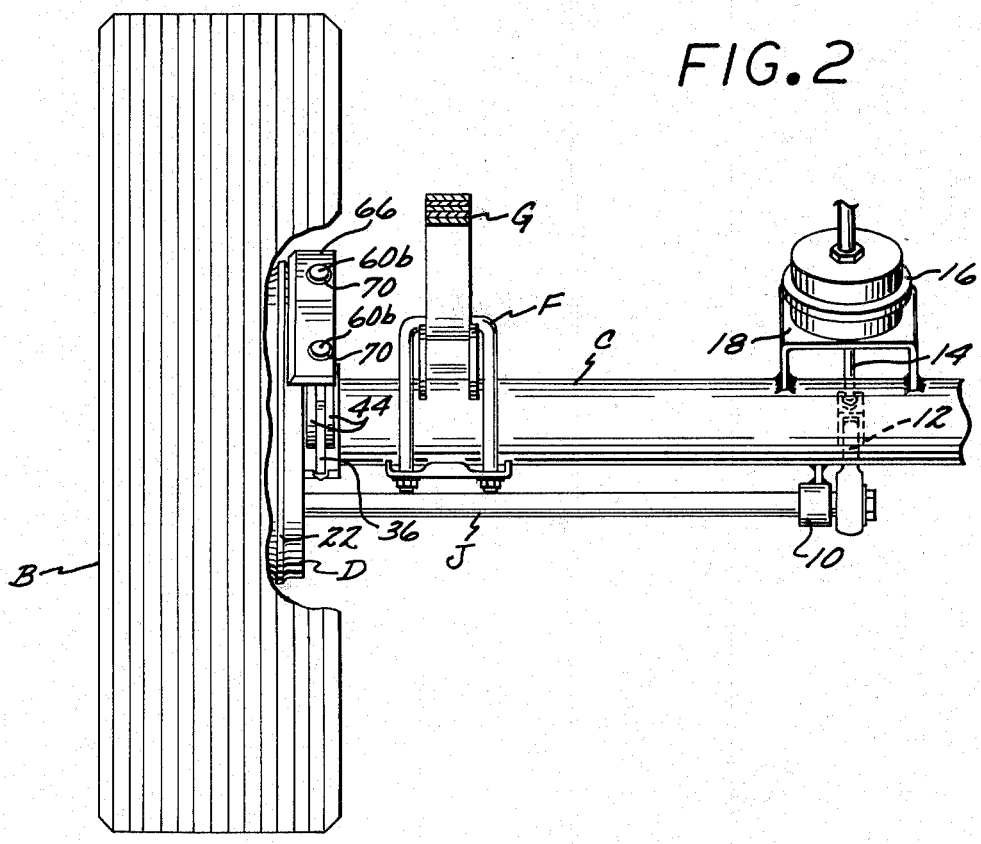
FIG. 2 is an end elevational view of the axle, the rotatably supported wheel and drum, and the emergency brake unit.

The emergency brake unit A is illustrated in FIGS. 1 and 2 of the drawings as being disposed adjacent a pneumatic-tired wheel B, with the unit removably supported from an axle C. The wheel B has a cylindrical brake drum D secured thereto, as shown in FIG. 2. A shackle F is secured to axle C, which shackle engages a heavy spring G, with the spring partially supporting the load-carrying portion of the vehicle (not shown).

In FIGS. 1 and 2 it will be seen that the brake drum D has two brake shoes H pivotally anchored within the interior thereof, with the brake shoes being pivoted to a braking position with the interior surface of drum D by rotation of a rod J that is supported in a bearing 10 on the axle C.

The rod J has an arm 12 extending outwardly therefrom that is pivotally connected to a piston rod 14 that is actuated by an air cylinder 16. The cylinder 16 is supported from the axle C by a bracket 18. The air cylinder 16 is utilized to actuate the brake shoes H in the normal braking of the vehicle.

In FIG. 5 it will be seen that the brake shoes H have a space 20 between adjacent first ends thereof, and it is in this space that the emergency brake unit A extends to brake the vehicle, as will later be explained in detail. The brake drum D has a circumferentially extending rib 22 formed thereon, inwardly disposed from the free end 24 of the drum D. Drum D includes an external cylindrical surface 26 and internal cylindrical surface 28.

The emergency brake unit A, as can best be seen in FIG. 1, includes a first semi-circular clamp 30 which has a first pair of lugs 30a extending outwardly therefrom, and a second semi-circular clamp 32 that is likewise provided with a pair of outwardly extending second lugs 32a. The lugs 30a and 32a are in abutting contact, and bolts 34 extend through openings (not shown) in the pairs of first and second lugs 30a and 32a to hold them in a fixed, non-rotatable position on the axle C. The second semi-circular clamp 32 has a pair of spaced arms 36 projecting therefrom, which arms are best seen in FIG. 4. A pair of longitudinally extending slots 38 are formed in the pair of arms 36.

The emergency brake unit A includes a rigid metallic body 40, as best seen in FIGS. 3 and 4, that has an inwardly extending braking portion 41 which defines a curved surface 42 on the upper surface thereof. In FIG. 3 is will be seen that the body portion 41 extends into the interior of the brake drum D in the space 20 formed between the adjacent first ends of the brake shoes H. The surface 42 is of substantially the same radius of curvature as the interior cylindrical surface 28 of the brake drum D. The body 40, as illustrated in FIG. 5, has oppositely disposed, bifurcated end portions 44 that are slidably mounted on the legs 36. The bifurcated end portions 44 support transversely disposed pins 46, which pins are best seen in FIG. 4, and are slidably movable in the slot 38. Due to the engagement of pins 46 and slots 38, the body 40 may move inwardly and outwardly relative to the axle C. The body 40 has a cylindrical cavity 48 that extends upwardly from the side 50 thereof, with the cavity 48 serving as a hydraulic cylinder in which hydraulic fluid L may flow into and out of through a conduit 52 shown in FIG. 3.

The hydraulic cylinder 48 has a piston 54 slidably disposed therein, with the upper end of this piston preferably having a cup-shaped seal 54a mounted thereon.

The piston 54 has a piston rod 56 extending downwardly therefrom, as viewed in FIG. 4, to engage a cross piece 58. The crosspiece 58 has two parallel rigid members 60 extending upwardly therefrom, as shown in FIG. 4, with the members 60 being laterally spaced and slidably movable in sleeves 62 that are disposed in fixed positions in openings 64 formed in the body 40. The members 60, as may be seen in FIG. 6, are preferably of square transverse cross section. The upper ends of members 60, as viewed in FIG. 4, support an arcuate brake shoe 66 that has an interior curved surface of substantially the same radius of curvature as that of the external surface 26 of the brake drum D. In FIG. 3 it will be seen that a portion of the brake shoe 66 overlies the body portion 41 of the body 40 whereby the brake shoe 66 and body portion 41 can grip the brake drum D therebetween when the emergency brake unit A is actuated.

The members 60 and cross piece 48 cooperatively provide a yoke K which supports the brake shoe 66, with the yoke K being movable relative to the body 40 due to the piston rod 56 being connected thereto. The members 60 have first shouldered end portions 60a that extend into openings 58a formed in the cross piece 48, and are held in position on the members 60 by snap rings 70 which engage circumferentially extending grooves 72 formed in the end portions 60a. The piston rod 56 has an end portion 56a that is disposed in an opening 58b formed in the cross piece 48, with the end portion 56a being held therein by snap rings 70 which engage a groove 72 formed in the end portion 56a. Members 60 include shouldered end portions 60b that are disposed in openings 74 formed in the arcuate brake shoe 66, and are held in fixed positions in the opening by snap rings 70 which engage grooves 72 formed in the end portions 60b. The upper central portion of the body 40, as viewed in FIG. 4, has a recess 76 therein that is axially aligned with a recess 78 formed in the brake shoe 66. A helical spring is disposed in the recesses 76 and 78 and serves to maintain the body 40 and brake shoe 66 in the first spaced relationship as shown in FIG. 4 and out of contact with drum D.

The air cylinder 16 will normally be used to actuate the brake shoes H to slow down or stop the vehicle with which they are associated. However, in an emergency the operator of the freight vehicle will cause hydraulic fluid to flow through the conduit 52 to the cylinder 48, and as the volume of hydraulic fluid L in the cylinder increases, the piston 54 and piston rod 56 are moved downwardly as shown in FIG. 4. Such downward movement results in the yoke K also being moved downwardly to force the brake shoes 66 into frictional contact with the external surface 26 of the brake drum D. After the brake drum 66 is in slidable frictional contact with the brake drum surface 26, the yoke can no longer move toward the axle C. As additional fluid is forced into the hydraulic cylinder 48, the body 40 is forced upwardly away from the axle C to bring the curved surface of the brake portion 41 into slidable frictional contact with the interior surface 28 of the brake drum D. The brake drum D that is then rotating, is frictionally gripped between the adjacent surfaces of the brake shoe 66 and body brake portion 41. As the brake shoe 56 and body brake portion 41 are moved into gripping contact with the brake drum D, the spring 80 is compressed.

Upon the pressure in the hydraulic fluid L in the cylinder 48 being released, the spring 80 tends to expand to the position shown in FIG. 4, and in so doing, moves the body 40 and the brake shoe 56 away from one another, and out of contact with the brake drum D to the first spaced relationship shown in FIG. 4.

The body portion 40 and brake shoe 56 will remain in the position shown in FIG. 4 until another emergency arises in which hydraulic fluid L is discharged into the cylinder 48 to actuate the emergency unit A. Although but one emergency brake unit A is shown in FIGS. 1 and 2, it will be apparent that such units must be used in pairs on opposite ends of an axle rotatably supporting wheels that have brake drums D secured thereto.

The use and operation of the emergency brake unit has been previously described and need not be reported.

I claim:

1. In combination with an axle of an automotive freight vehicle that rotatably supports a pair of pneumatic-tired wheels on the ends thereof, which wheels have open brake drums secured thereto that extend inwardly towards one another, each of which drums include an external and internal cylindrical surface, said brake drums each having two pivotally supported brake shoes therein that have first ends thereof spaced from one another, power means for pivoting said brake shoes in said brake drums to braking positions, a pair of emergency brake units for braking said pneumatic-tired wheels by hydraulic fluid under pressure from a source thereof independent of said power means, each of said emergency brake units including:

clamp means that grip said axle adjacent one of said brake drums;

a pair of spaced arms supported from said clamp means;

an arcuate first brake shoe that has a portion thereof disposed adjacent said external surface of said brake drum;

a yoke that includes a cross piece and two rigid members that extend therefrom, said members supporting said first brake shoe from the free ends thereof;

a rigid body movably supported from said arms for longitudinal movement relative thereto, said body including a second arcuate brake shoe that is disposed adjacent said internal surface in the space between said first ends of said pivotally supported brake shoes, said body slidably supporting said members of said yoke said body having a cavity therein that serves as a hydraulic cylinder;

compressed spring means disposed between said first brake shoe and body that at all times tend to maintain said first and second brake shoes in a first spaced relationship wherein said first and second brake shoes are out of contact with said brake drum;

conduit means for discharging hydraulic fluid under pressure into and out of said cavity;

a piston slidably and sealingly mounted in said cavity; and a piston rod extending from said piston to said yoke, with said hydraulic fluid as it discharges into said cavity first moving said first brake shoe towards said body to dispose said first brake shoe in pressure frictional contact with said external surface of said brake drum, and said hydraulic fluid as it continues to discharge into said cavity moving said body away from said axle to dispose said second brake shoe in pressure frictional contact with said internal surface of said drum.

2. An emergency brake unit as defined in claim 1 wherein said clamp means includes:

first and second semi-circular clamps that extend transversely about said axle;

first and second pairs of aligned lugs that extend outwardly from the ends of said first and second clamps, said first and second pairs of lugs having axially aligned openings therein; and bolt means that extend through said openings for removably holding said first and second semi-circular clamps in frictional gripping contact with said axle.

3. An emergency brake unit as defined in claim 2 wherein said spaced arms have longitudinally extending elongate slots formed therein, with said arms being supported from said second clamp, and said emergency brake unit further including:

a pair of transverse pins mounted on said body and slidably engaging said elongate slots for movably supporting said body from said arms.

4. An emergency brake unit as defined in claim 2 wherein said spaced arms have longitudinally extending elongate slots formed therein, said arms being supported from said second clamp, and said emergency brake unit further including:

a pair of bifurcated ends on said body that slidably engage said arms; and a pair of transverse pins supported by said bifurcated ends that extend through said slots and are longitudinally slidable therein to permit said body to move relative to said pair of arms.

* * * * *